United States Patent
Haas

(10) Patent No.: US 12,324,481 B1
(45) Date of Patent: Jun. 10, 2025

(54) BOOT WITH INTEGRATED RULER

(71) Applicant: Haas Online Enterprise, LLC, Gilbert, PA (US)

(72) Inventor: Jordan A Haas, Gilbert, PA (US)

( * ) Notice: Subject to any disclaimer, the term of this patent is extended or adjusted under 35 U.S.C. 154(b) by 0 days.

(21) Appl. No.: 18/330,557

(22) Filed: Jun. 7, 2023

Related U.S. Application Data

(60) Provisional application No. 63/351,287, filed on Jun. 10, 2022.

(51) Int. Cl.
*A43B 23/02* (2006.01)
*A43B 3/00* (2022.01)
*G01B 3/02* (2020.01)
*G09F 19/20* (2006.01)

(52) U.S. Cl.
CPC ............... *A43B 3/00* (2013.01); *A43B 23/02* (2013.01); *G01B 3/02* (2013.01); *G09F 19/20* (2013.01)

(58) Field of Classification Search
CPC ....... A43B 3/0078; A43B 3/02; A43B 3/0036; A41H 1/02; A41D 19/0027; A41D 27/08; G01B 3/1003; G01B 3/02
See application file for complete search history.

(56) References Cited

U.S. PATENT DOCUMENTS

| | | | | |
|---|---|---|---|---|
| 3,601,817 A * | 8/1971 | Abrams | ............... | A41D 15/002 2/269 |
| 4,750,268 A * | 6/1988 | Ravid | ...................... | A41H 1/02 33/2 R |
| 5,836,828 A * | 11/1998 | Sinton | .................. | A63B 71/146 473/409 |
| 7,810,169 B2 * | 10/2010 | Grilliot | .................... | A41H 1/10 2/69 |
| 2002/0108162 A1 * | 8/2002 | Bolds-Leftridge | ...... | G09B 1/00 2/48 |
| 2004/0216219 A1 * | 11/2004 | Brevoort | .............. | A41B 11/001 2/239 |
| 2005/0022288 A1 * | 2/2005 | Habert | ................. | A41B 11/001 2/239 |
| 2006/0101673 A1 * | 5/2006 | Robinson | ........... | A43B 23/0235 36/136 |
| 2006/0265892 A1 * | 11/2006 | Sieber | ...................... | A41H 1/02 33/512 |
| 2009/0144881 A1 * | 6/2009 | Panosian | ............ | A41D 19/0027 2/163 |

(Continued)

FOREIGN PATENT DOCUMENTS

JP 2001131808 A * 5/2001
KR 100834999 B1 * 6/2008

*Primary Examiner* — Jillian K Pierorazio
(74) *Attorney, Agent, or Firm* — Karen Tang-Wai Sutton

(57) ABSTRACT

A boot with an integrated ruler in a first embodiment features true measurement markings corresponding to standard measurement units positioned vertically on a foot portion extending to a shaft of the boot, and in a second embodiment, the measurement markings are visual indicators on the foot portion of the boot, that may in some other embodiments correspond with the vertical measurement markings in the first embodiment. In another embodiment, the boot features a moisture sensitive exterior that when exposed to water, changes color or pattern in conjunction with the integrated ruler as further way to incorporate measurement markings into the boot.

12 Claims, 5 Drawing Sheets

(56) References Cited

U.S. PATENT DOCUMENTS

| | | | |
|---|---|---|---|
| 2011/0314698 A1* | 12/2011 | Cox | A43B 1/0027 36/100 |
| 2012/0266355 A1* | 10/2012 | Husain | A41D 19/0027 2/159 |
| 2013/0031696 A1* | 2/2013 | Jundt | A41D 19/0082 2/163 |
| 2013/0263355 A1* | 10/2013 | Mavraganes | A61B 42/00 2/161.7 |
| 2014/0366238 A1* | 12/2014 | Owen | C09D 7/00 2/69 |
| 2015/0024933 A1* | 1/2015 | Drago | B41M 3/00 428/29 |
| 2015/0081468 A1* | 3/2015 | Fenimore | G06Q 30/0621 705/26.5 |
| 2015/0264995 A1* | 9/2015 | Hilderbrand, IV | A41B 11/008 2/455 |
| 2015/0361601 A1* | 12/2015 | Ilmanen | D04B 3/00 66/1 A |
| 2016/0353828 A1* | 12/2016 | Chen | A43B 1/0072 |
| 2017/0258641 A1* | 9/2017 | Stein | A61F 13/08 |
| 2017/0340020 A1* | 11/2017 | Cohen | A41B 11/001 |
| 2018/0103728 A1* | 4/2018 | Koo | B41M 3/00 |
| 2019/0172362 A1* | 6/2019 | Errigo | G09B 1/02 |
| 2020/0154829 A1* | 5/2020 | Smith, III | A43B 1/0072 |

\* cited by examiner

BOOT WITH INTEGRATED RULER

CROSS-REFERENCE TO RELATED APPLICATIONS

This application is a utility of U.S. provisional application Ser. No. 63/351,287 filed on 10 Jun. 2022 from which priority and benefit is claimed under all applicable sections of Title 35 of the United States Code including, but not limited to, Sections 120, 121, and 365(c), and which in its entirety is incorporated by reference into this application.
NA

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention is in the field of boots and footwear and specifically relates to boots with one or more integrated rulers on an exterior side of the boot so as to allow a wearer to measure height, length or both using the boots.

Background Art

Children living in northern climates love playing in the snow and one of the joys of winter is estimating how much snow has fallen. There is no easy way for a child to measure snow height, other than to estimate it against a leg or boot height and most children have no idea how much snow has fallen because they are not particularly good at estimating measurement due to lack of experience. In the southern parts of the US, or in spring and summer in the more temperate areas, there are many small streams and puddles to explore, and in each case, children would love to know how deep the water (or mud) may be, but have no practical way to accurately measure it, other than by estimating the height of the water or other thing to be measured against the height of the boots being worn. There are many other instances where it would be useful to be able to measure height or length using one's own foot apparel, but few people know how tall their boots are, or how long their feet are in inches or some other standard length.

What is needed is a boot with an integrated ruler in the boot shaft and/or the length of the foot portion of the boot that allows the wearer to accurately measure height against the boot shaft and/or length against the foot portion of the boot.

What is also needed is a boot that incorporates color or patterns that change when the boot gets wet, providing the wearer an additional visual for determining snow or water height.

DISCLOSURE OF INVENTION

In a first aspect of the invention, a boot including various pull-on and lace up styles of boots and including shoes without a shaft, the boot for enclosing a foot of a wearer is comprised of a foot portion having an exterior side and an interior compartment sized and shaped to receive the foot and cover a toe portion, a heel, and a midfoot between the toe portion and the heel of the foot, with a foot receiving opening at a top side of the foot portion, a shaft encircling the foot receiving opening and extending upwards, whereby the wearer's foot enters the shaft prior to entering the interior compartment of the foot portion, and an integrated ruler permanently formed on at least the foot portion of the boot. The exterior side is further comprised of a top side, a footbed and a sidewall joining the top side with the footbed. The integrated ruler is further comprised of a series of visual measurement markings positioned at regularly spaced intervals corresponding to either metric units, imperial units or combinations of metric and imperial units of measurement.

In a second aspect of the invention, the integrated ruler extends vertically from the foot portion to the shaft of the boot.

In a third aspect of the invention, the integrated ruler is further comprised of a lateral line on the exterior side positioned approximately above an approximate area where the toe portion meets the midfoot of the wearer, the lateral line simulating a terminal end of a toe cap of the boot.

In a fourth aspect of the invention, the integrated ruler includes a visual indicator positioned on the top side of the foot portion corresponding to one of the series of measurement markings on either the foot portion or the shaft.

In a fifth aspect of the invention, the integrated ruler is further comprised of a visual change of a wet portion of the exterior side compared to a dry portion of the exterior side of the boot.

In a sixth aspect of the invention, the visual change is a change in color, pattern, or both between a wet portion of the exterior side compared to the dry portion of the exterior side.

In a seventh aspect of the invention, the integrated ruler is formed horizontally along the sidewall of the boot.

In an eight aspect of the invention, the visual measurement markings of the integrated ruler include one or more colors, numbers, or symbols.

In a ninth aspect of the invention, the series of visual measurement markings are numbers oriented upside down as viewed from a side elevation view of the boot but right side up as viewed by the wearer when the boot is worn on the foot.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
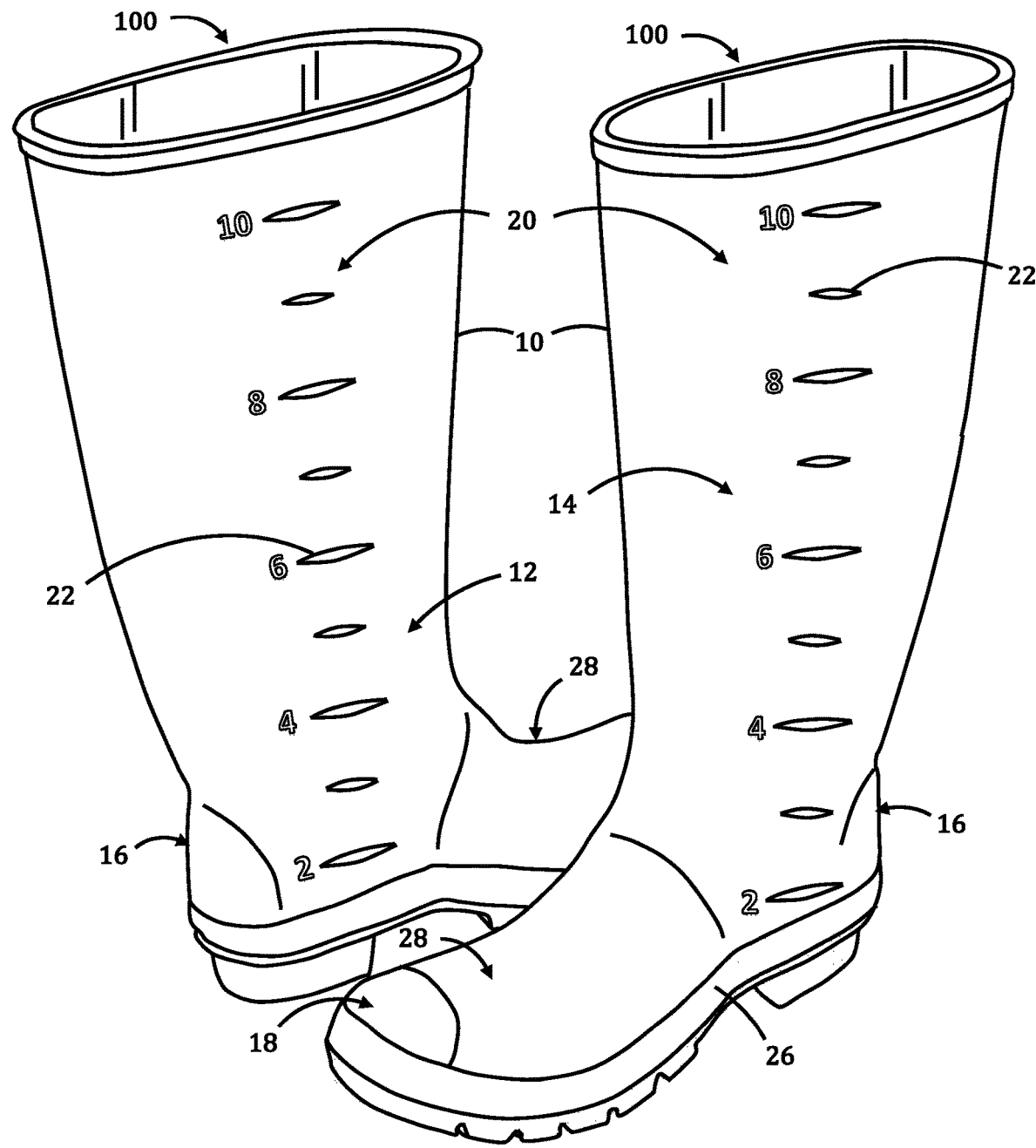
FIG. 1 is a perspective view of a pair of pull-on style rain boots, with a first embodiment of an integrated ruler positioned on both inside and outside facing sides of the shaft of each boot of the pair of boots, and where an exterior of the boots is dry.

The following is a list of reference labels used in the drawings to label components of different embodiments of the invention, and the names of the indicated components:
- 100 boot
- 10 shaft
- 12 inside facing side of shaft
- 14 outside facing side of shaft
- 16 foot portion
- 18 toe portion
- 20 ruler
- 22 measurement marking
- 24 visual change (design, pattern, color, symbol)
- 26 sidewall
- 28 top side
- 30 footbed

DETAILED DESCRIPTION

A boot with an integrated ruler according to the invention or boot 100 is shown in FIGS. 1-5 as a pair of boots in representative pull-on and lace-up styles. The different boot styles in the FIGS. are shown configured for children, however the inventor notes that his invention is easily adapted for use with any boot style having a foot portion 16 and a shaft 10. A sole of the wearer's foot rests on the footbed 30. The foot portion 16 is further comprised of a top side 28 and a sidewall 26, with the sidewall 26 connecting the top side 28 with the footbed 30. The sidewall 26 may be continuous and cover the heel and toes of the wearer's foot, or discontinuous and typically exposing the wearer's heel.

In the embodiments shown in the FIGS., a toe portion 18 of the boot 100 necessarily is closed as the boot 100 is designed to be worn in wet or snowy conditions. The term "boot" in this disclosure refers equally to a single boot in a pair of boots, or to the pair of boots of a same general style, regardless of any other differences between the boots, as well as to any footwear including shoes that cover the toes of the wearer but not the wearer's heels, or shoes or boots with relatively short or non-existent shafts that expose the wearer's ankles. The inventor notes that while some of the boots shown in the FIGS. are shown in pairs, with each pair is comprised of a left boot and a right boot, the left and right boots in the pair of boots can be identical to one another, or each can individually incorporate different embodiments of an integrated ruler 20. The FIGS. thus show some representative embodiments of the invention but are not meant to be limiting the invention to just the embodiments and configurations shown.

Figure 4:
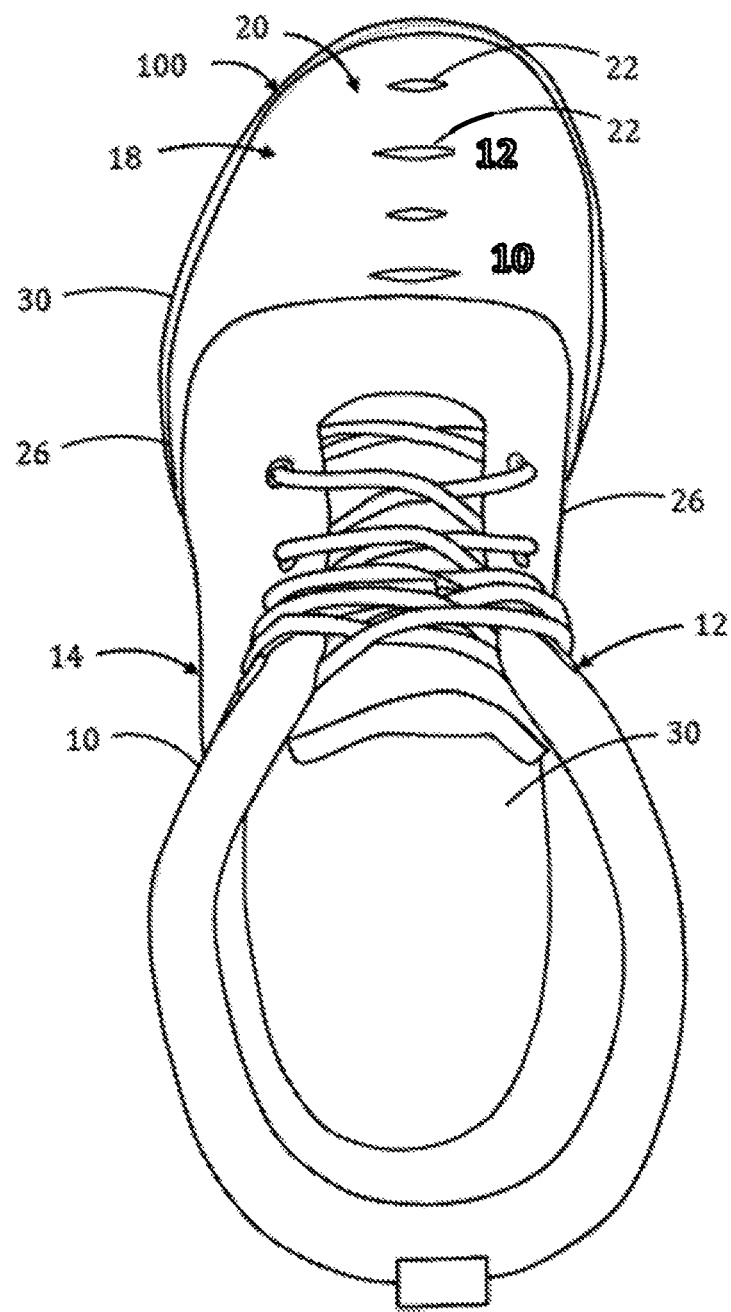
FIG. 4 is a top view of a lace-up hiking style boot showing a second embodiment of the integrated ruler along a foot portion in an approximate toe cap area across a toe portion of the shoe corresponding to a measurement marking of the integrated ruler vertically positioned on the boot.
Figure 5:
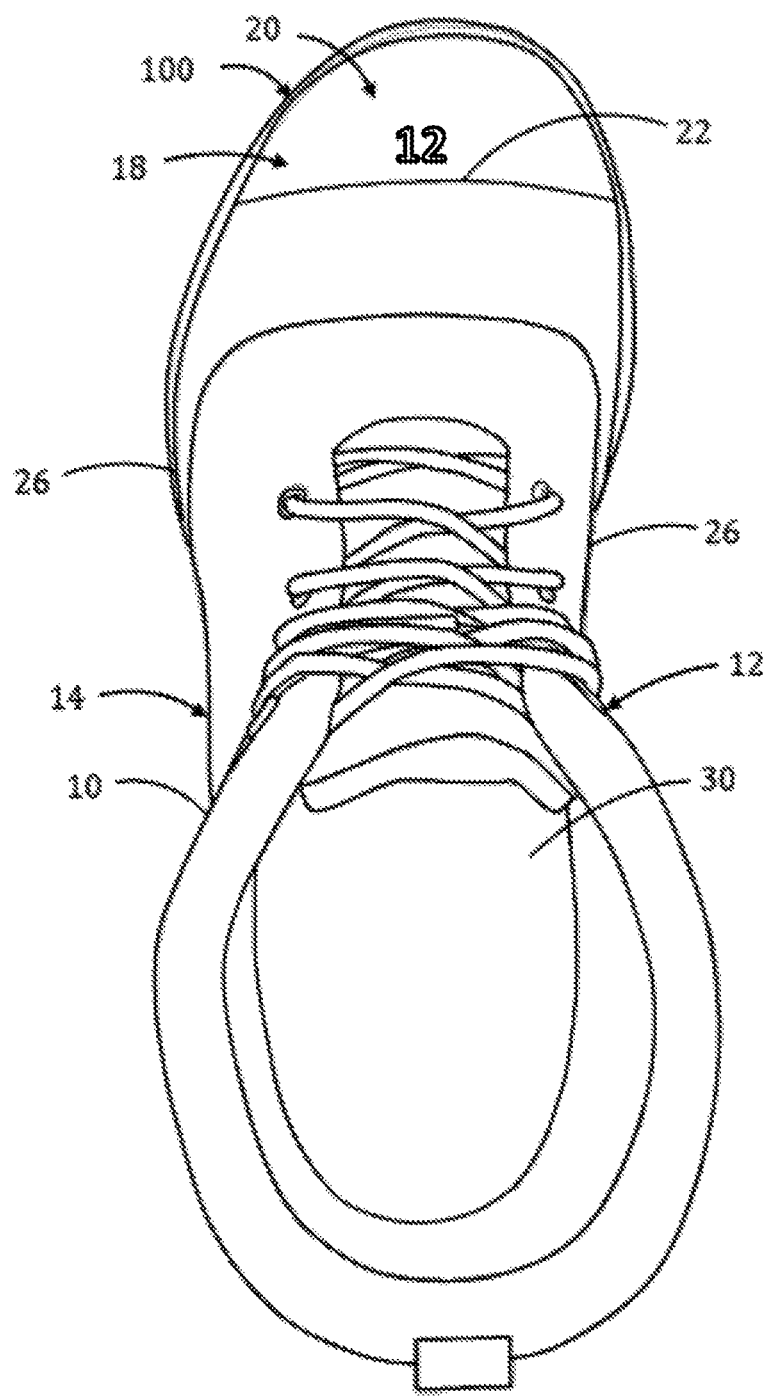
FIG. 5 is a top view of a second lace-up hiking style boot showing a third embodiment of the integrated ruler along the foot portion of the boot, where a visual designation shown on the toe portion of the boot includes a number and a toe cap line corresponding with a measurement marking line positioned vertically on the boot.

The boot 100 in the embodiments shown in the FIGS. has the foot portion 16 attached to or integrally formed with the shaft 10, with either the shaft 10 or the foot portion 16 having an integrated ruler 20 with one or more measurement markings 22. Note that the embodiment where the integrated ruler in formed vertically on the shaft 10 of the boot 100 includes measurement markings 22 vertically along the sidewall 26 of the foot portion 16, and hence references to this embodiment includes measurement markings 22 on both the foot portion 16 and the shaft 10. The measurement markings 22 may be calibrated in metric or imperial system units and are true unit measurements allowing the wearer to use the integrated ruler 20 as he or she would any other measuring ruler or measuring tape. The integrated ruler 20 may be oriented vertically along the shaft 10 in a first embodiment, or in a second embodiment, along a portion of the foot portion 16 of the boot, such as horizontally along the sidewall 26 or as shown in FIG. 4, along a top side 28. The integrated ruler 20 can be positioned on either or both an inside facing side 12 or an outside facing side 14 of the shaft 10, on the top side 28 of the boot 100, or just on one side of each boot 100, or on different sides of each boot 100 in the pair of boots, etc.

Figure 3:
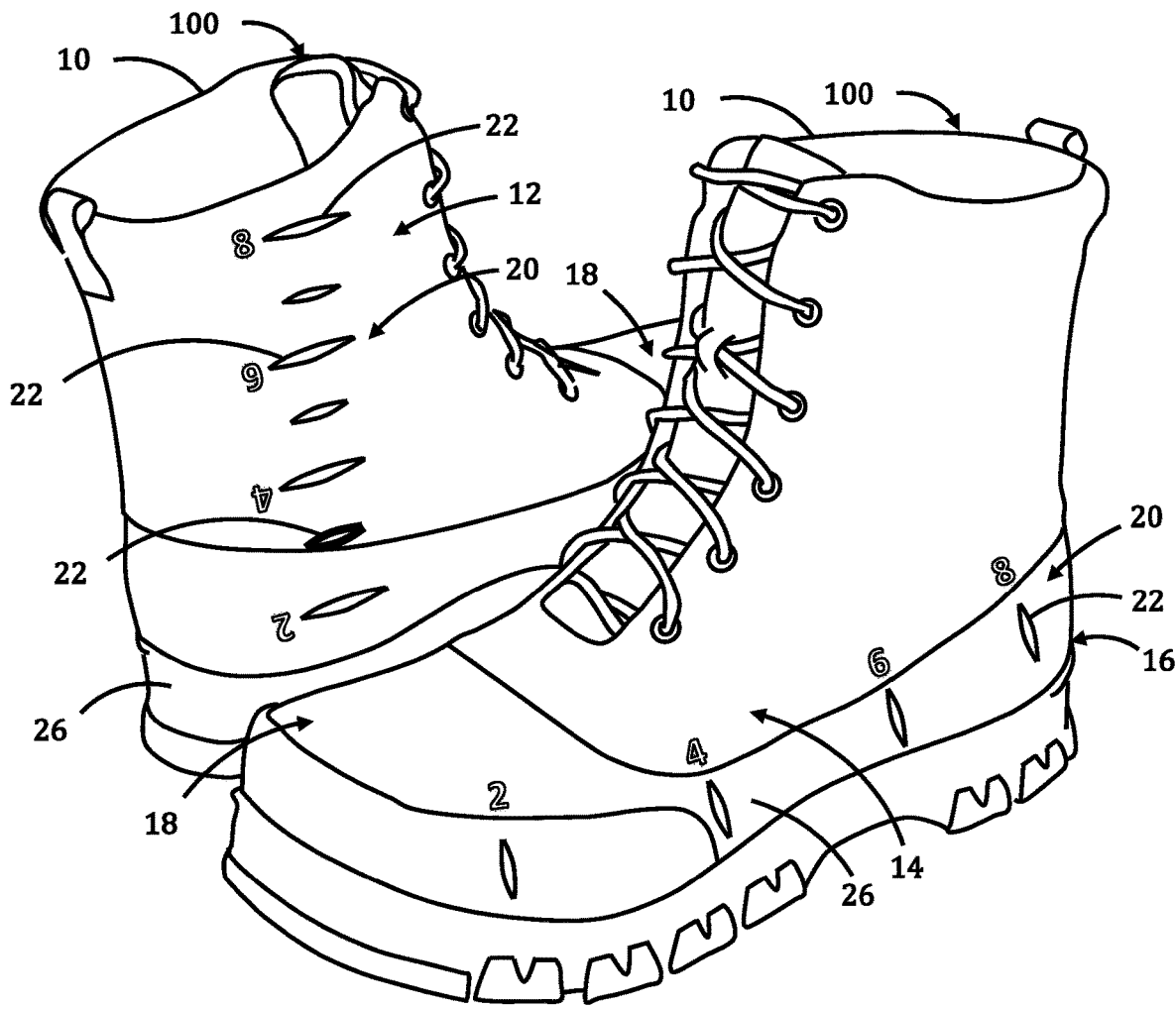
FIG. 3 is a perspective view of a pair of lace-up hiking style boots showing the integrated ruler along a side of the boot from a foot portion to the shaft on one boot and a second integrated ruler along a side wall of the boot.

The inventor notes that the measurement markings 22 shown in FIG. 1 for instance include numbers printed facing right side up in a side elevation view, however as shown in FIG. 3, the numbers can be printed upside down when viewed from the side elevation view to allow the wearer to glance at the boots from a top view and the numbers will appear oriented properly i.e., right side up to the wearer peering down at the boots. The inventor notes that many possible variations of the integrated ruler 20 are possible, and the FIGS. show just a few representative embodiments. Some boots may have a single integrated ruler 20 on each boot, or a pair of integrated rulers 20 on both the inside (or leg facing side) 12 and the outside facing side 14 of each boot. In yet another embodiment, the integrated ruler 20 on the foot portion 16 is incorporated into a same boot as the vertical integrated ruler 20 on the shaft, or between the individual left and right boots within a same pair of boots, so that one boot of the pair has the integrated ruler 20 oriented vertically on the shaft 10 and the other boot of the pair has the integrated rule 20 just on the foot portion 16, either on the top side 28 or on the sidewall 26, or both boots may have identical, matching integrated rulers 20. For the embodiment shown in FIG. 3, where one boot of the pair has the vertically oriented integrated ruler 20 and the other boot of the pair has a horizontally oriented integrated ruler 20 on the sidewall 26 or as in FIG. 4, on the top side 28, one boot is designed to measure height or depth, for instance the depth of a puddle, and the other boot is designed to measure length, etc. Many variations are possible, allowing for multiple ways the wearer can use the boots 100 to measure both height or depth and length with a single pair of boots.

Figure 2:
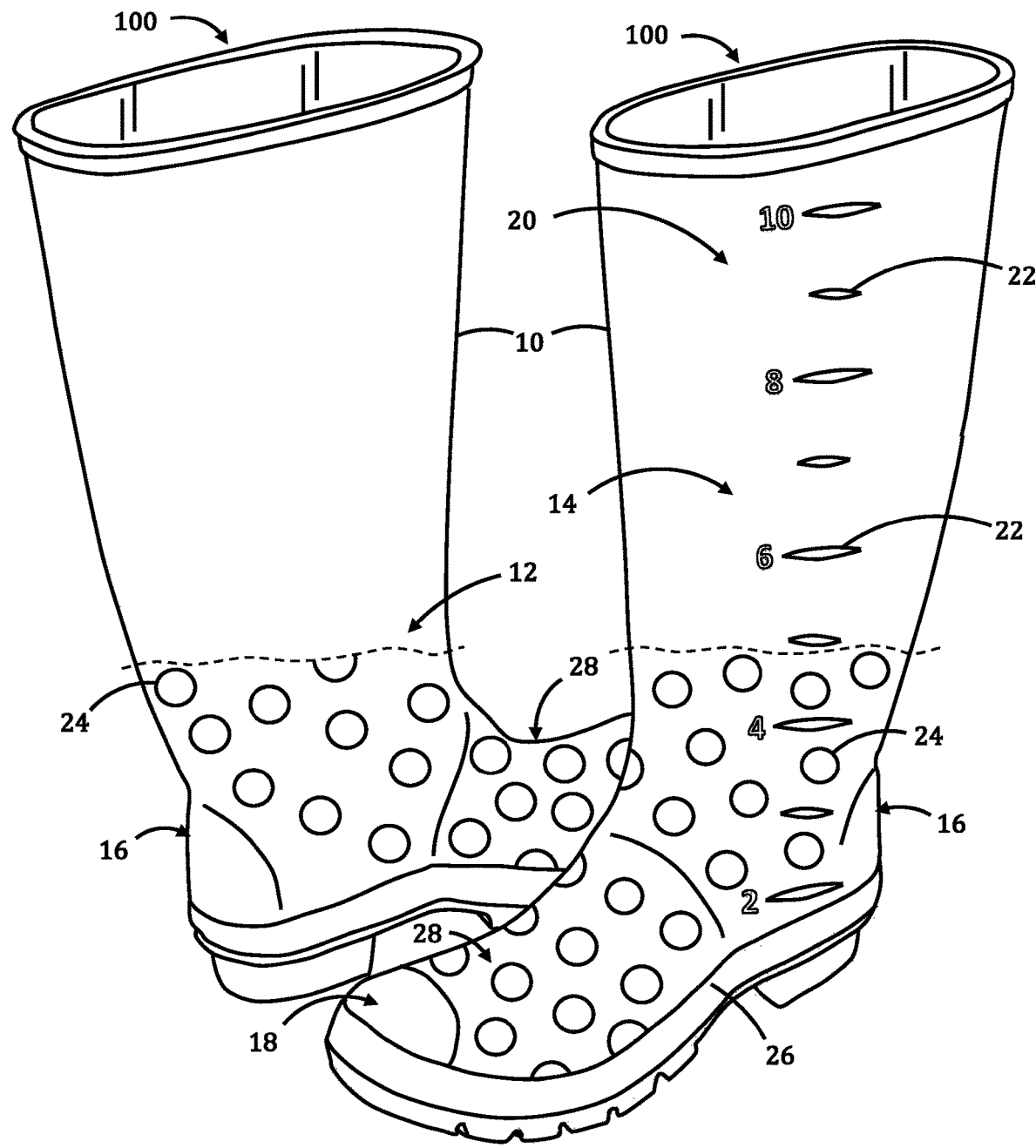
FIG. 2 is a side elevation view of a pair of pull-on style boots, showing a visual change resulting from a portion of the boots below the dashed line having been exposed to water. The integrated ruler is positioned on just an outward facing side of the shaft.

The measurement markings 22 for the ruler may be raised lines formed into the boot 100, printed lines on an exterior side of the boot 100, or other visual markings. In one embodiment illustrated in FIG. 2, the boot 100 further incorporates moisture sensitive technology where a visual change 24 is a pattern on the exterior side of the boot 100 to allow the wearer to measure vertical depth of water or snow, as shown when comparing FIGS. 1-2 where FIG. 1 shows the boot 100 under dry conditions and FIG. 2 shows the boot 100 as it would appear after a portion of the boot 100 below the dashed line is exposed to water. The visual change 24 in the boot can be a change in pattern, design, color, lines or other symbols on a wet portion of the boot as compared to a dry portion of a same boot 100.

The inventor notes that providing boots 100 that with the visual change 24 when exposed to water is not in and of itself a new idea and is currently used in mugs and other items decoratively. The inventor's use of the visual change 24 of color, pattern, etc. as a measuring tool integrated into the boot is unique and not found in the prior art. The inventor notes that visual changes in the exterior side of the boot indicating differences in wet and dry areas of the boot are not only decorative but have the added benefit of disguising the measurement markings 22 for a more subtle visual effect that does not otherwise detract from the boot's overall aesthetics yet retains the functionality of the integrated ruler 20. For instance, in FIG. 2, the visual change 24 of the boot ends at approximately at the measurement marking for 5 inches, indicating to the wearer that the water or snow contacting the boots is about 5 inches in height or depth. The inventor is unaware of any other boots that use the visual change 24 as a measuring tool.

In the second embodiment, the boot 100 features an integrated ruler 20 along the sidewall 26 of the foot portion 16 of the boot 100, where the measurement marking 22, configured as one or more lines or other markings indicating the measured intervals are positioned across the toe portion 18 of the boot 100, typically along a widest portion. Many boots and shoes feature a toe cap as a design feature, with a terminal end of the toe cap located approximately above an area where the toe portion is attached to the midfoot of the wearer. In the present invention, with a representative embodiment shown in FIG. 5, the measurement marking 22 is easily and subtly incorporated into the toe cap as an additional functional measuring element. The measurement line 22 at the traditional toe cap area of a boot in a representative embodiment features either a number indicating length or some type of mark such as a color or other visual indicator corresponding to the measurement marking 22 on the integrated ruler 22 of the boot shaft 10. The measurement line 22 thus is effectively a visual toe cap line. For instance, if a total length of the sidewall 26 of the foot portion 16 of the boot is 12 inches, a number 12 can be stamped at the toe cap line, and/or the line indicating 12 inches on the shaft 10 of the boot 100 can be highlighted by being wider or longer, or the toe cap line can include a color or other visual that is also included on the same measurement marking 22 on the shaft 10 to denote the overall length of the foot portion 16 to the wearer. Alternatively, the measurement marking 22 in FIG. 5 can also denote the length of the foot portion 16 of the boot 100 measured from the heel of the boot to the measurement marking 22. Hence in FIG. 5, the number 12 at the toe cap line could indicate the length of the boot from the heel to the toe cap line/measurement marking 22 OR it could simply indicate the entire length of the boot 100. In FIG. 4, the integrated ruler 20 is positioned on the toe portion of the boot 100, where the measurement markings 22 indicate length as measured from the heel of the boot to the markings 22. Other lines along the sidewalls 26 of the foot portion 16 of the boot 100 can also be included to indicate various distances that correspond to the integrated ruler 22 on the boot shaft 10 serving as visual indicators to the wearer of measured length. The measurement markings 22 can be subtle or obvious, according to consumer preferences and boot style. Children's style may prefer the measurement markings 22 and the integrated ruler 20 be more visually obvious, while adults may prefer more subtle markings to preserve the traditional boot aesthetic while incorporating the functionality of the integrated ruler 20.

The integrated ruler 20 for the boot shaft 10 or foot portion 16 of the boot 100 can be easily included into many boot styles in addition to the representative styles shown in the FIGS., including those using Velcro® or other fastening means. The boots shown in the FIGS. are for illustrative purposes only to show how the invention will look on different boot styles. The inventor believes his design has the most appeal for children, who love playing outside and who would find the integrated ruler 20 fun and appealing. Adults may also enjoy these boots, as they provide a highly accurate way of measuring when outside and require no extra equipment. The ability to make the boots in each pair identical or different in terms of placement of the integrated ruler 20 means that one boot can be used to measure height or depth and the other to measure length, allowing the wearer to simultaneously make two different measurements just by glancing at his or her boots.

It is to be understood that the above-described arrangements are only illustrative of the application of the principles of the present invention. Numerous modifications and alternative arrangements may be devised by those skilled in the art without departing from the scope of the present invention. For instance, while the invention is aimed primarily at children, there are many useful adult applications, such as work boots, or even other types of non-boot footwear such as gardening shoes or clogs where measuring off distances is common and having the measurements right on the wearer's shoes is thus highly useful.

The inventor believes his integrated ruler 20 is most useful configure as part of a boot, but notes that the second embodiment, where the integrated ruler 20 is incorporated into a toe cap on the top side 28 or along the sidewall 26 of the foot portion 16 could easily be used with a variety of shoes or ankle boots with a short or non-existent shaft 10. Thus, the use of the term "boot" in this disclosure is not meant to limit the invention to just boots where the shaft 10 extends to at least the wearer's ankles but is an expansive term for footwear with a non-variable length footbed 30, particularly those that cover the toes and heels of the wearer. For some types of footwear, for instance gardening clogs in which the heel is exposed, the integrated ruler 20 is used mostly for measuring length as opposed to depth, and this embodiment is specifically included as part of the invention.

I claim:

1. A measuring tool for measuring a height and a length of either a medium in which the measuring tool is placed or an object positioned next to the measuring tool, the measuring tool adapted to be worn on a foot and a leg of a wearer, the measuring tool comprising:
    an article of footwear having an exterior side, a foot portion with a heel end, an opposed toe end, a top side and an opposed bottom side, a horizontal length measured from the heel end to the toe end, and a vertical height measured from the bottom side to the top side; and
    an integrated ruler having a series of visual measurement gradations positioned at regularly spaced intervals corresponding to either metric units, imperial units or combinations of metric and imperial units of measurement formed into the exterior side of the article of footwear;

wherein the measurement gradations are arranged so as to increase from the bottom side of the article of footwear in a direction upward along the vertical height aligned with the leg of the wearer and set so as to mark a height of each gradation from the bottom side of the article of footwear, whereby the height of the medium in which the measuring tool is placed is ascertained or whereby the height of the object next to the measuring tool is ascertained.

2. The measuring tool in claim 1, wherein the measurement gradations are arranged so as to increase from the heel end in a horizontal direction aligned with a foot of the wearer and set so as to mark a horizontal length of each gradation from the heel end to the toe end, whereby the length of the medium in which the measuring tool is placed is ascertained or whereby the length of the object next to the measuring tool is ascertained.

3. The measuring tool in claim 1, wherein the article of footwear includes an encircling shaft with a shaft height adapted to receive the leg of the wearer, and wherein the vertical height of the article of footwear includes the shaft height.

4. The measuring tool in claim 3, wherein the article of footwear is a pull-on rainboot.

5. The measuring tool in claim 3, wherein the article of footwear is a lace-up style hiking boot.

6. The measuring tool in claim 1, wherein the top side is further comprised of a lateral line positioned between the heel end and the toe end, with a number positioned near the lateral line indicating either the horizontal length of the article of footwear, or a length of the foot portion measured from the heel end to the lateral line.

7. The measuring tool in claim 1, wherein the measurement gradations of the integrated ruler are further comprised of a visual change of a wet portion of the exterior side compared to a dry portion of the exterior side of the article of footwear.

8. The measuring tool in claim 7, wherein the visual change is a change in color, pattern or both between a wet portion of the exterior side compared to the dry portion of the exterior side.

9. The measuring tool in claim 1, further comprising a second integrated ruler formed along the horizontal length between the heel and toe ends.

10. The measuring tool in claim 1, wherein the visual measurement markings of the integrated ruler include one or more colors, numbers, or symbols.

11. The measuring tool in claim 1 wherein the series of visual measurement markings are numbers oriented upside down as viewed from a side elevation view of the article of footwear.

12. The measuring tool in claim 1, wherein the article of footwear is a closed-toe shoe.

* * * * *